United States Patent [19]

Araoka

[11] Patent Number: 4,460,181
[45] Date of Patent: Jul. 17, 1984

[54] METHOD AND MECHANISM FOR CONTROLLING THE PRESSURE AT SHAFT-SEALING PART OF AN APPARATUS

[75] Inventor: Toshinobu Araoka, Kitakyushu, Japan

[73] Assignee: Toyo Denki Kogyosho Co., Ltd., Fukuoka, Japan

[21] Appl. No.: 274,593

[22] Filed: Jun. 17, 1981

[30] Foreign Application Priority Data

Jun. 26, 1980 [JP] Japan .................................. 55-87275
Jul. 1, 1980 [JP] Japan .................................. 55-90291
Aug. 30, 1980 [JP] Japan .................................. 55-120075

[51] Int. Cl.³ .............................................. F16J 15/40
[52] U.S. Cl. ...................................... 277/12; 277/3; 277/15; 277/17; 277/28; 277/2
[58] Field of Search ................ 277/28, 2, 3, 15, 17, 277/18, 27, 12, 1, 32

[56] References Cited

U.S. PATENT DOCUMENTS

| | | | |
|---|---|---|---|
| 1,005,596 | 10/1911 | Campbell | 277/28 X |
| 2,350,753 | 6/1944 | Grobel | 277/28 X |
| 2,665,929 | 1/1954 | Sawyer | 277/28 X |
| 2,895,750 | 7/1959 | Gardner et al. | 277/28 X |
| 2,903,970 | 9/1959 | Elovitz et al. | 277/28 X |
| 3,161,413 | 12/1964 | Audemar | 277/28 X |
| 3,176,996 | 4/1965 | Barnett | 277/28 X |
| 3,544,116 | 12/1970 | Peterson | 277/28 X |
| 3,700,246 | 10/1972 | Enarsson | 277/28 X |
| 3,740,057 | 6/1973 | Doyle et al. | 277/28 X |
| 3,746,472 | 7/1973 | Rupp | 277/28 X |
| 3,999,766 | 12/1976 | Barton | 277/28 |
| 4,168,070 | 9/1979 | Tsuchihashi et al. | 277/28 X |

FOREIGN PATENT DOCUMENTS

| | | | |
|---|---|---|---|
| 26162 | of 1904 | United Kingdom | 277/28 |
| 1527056 | 10/1978 | United Kingdom | 277/28 |

*Primary Examiner*—Robert S. Ward
*Attorney, Agent, or Firm*—Jordan and Hamburg

[57] ABSTRACT

A device for controlling the pressure at shaft-sealing parts of an apparatus, wherein pressure equal to an external pressure around the apparatus is established in an interconnect chamber as well as in a motor chamber so as to equalize pressures applied on the shaft-sealing parts disposed between an impeller chamber and the interconnect chamber and between the interconnect chamber and the motor chamber. Due to the above, the apparatus can eliminate any damages which may occur in the shaft-sealing parts of a conventional apparatus used in a pressurized atmosphere.

11 Claims, 11 Drawing Figures

FIG. 4
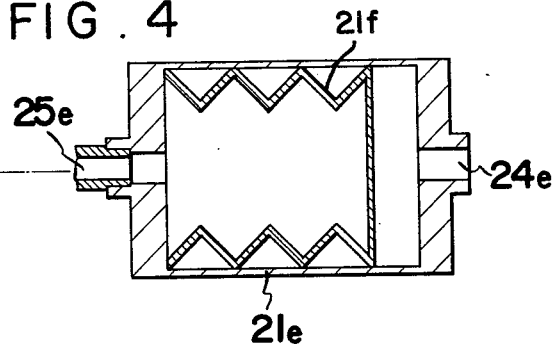
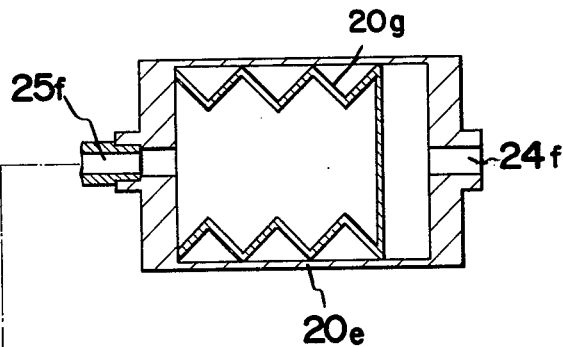
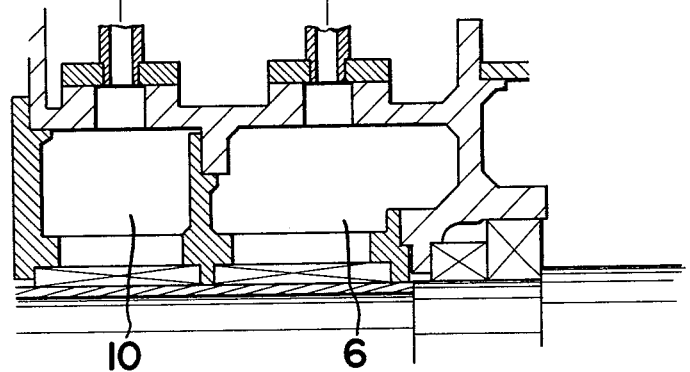

METHOD AND MECHANISM FOR CONTROLLING THE PRESSURE AT SHAFT-SEALING PART OF AN APPARATUS

BACKGROUND OF THE INVENTION

The present invention relates to a device for controlling the pressure applied to shaft-sealing parts of various equipment which snugly receives a rotating shaft. The device is especially applicable to the apparatus such as pumps and excavators which are provided with a motor chamber and an interconnect chamber and are operated in a pressurized atmosphere such as in water or in a tank containing a pressurized gas or liquid charged therein.

In general, the above-mentioned type of apparatus is assembled under an atmospheric pressure, and is then installed in a pressurized atmosphere or medium such as water. After installation, the interior of the equipment receives such atmospheric pressure while the exterior thereof is exposed to a certain pressure, naturally higher than the atmospheric pressure. Where the rotating shaft extends from the equipment by way of a shaft-sealing part, such shaft-sealing part receives the atmospheric pressure at the inside thereof and the exterior pressure at the outside thereof, thus producing a pressure difference therein. Such phenomenon also occurs where two pressure chambers having a pressure difference are divided by a partition, and the shaft-sealing parts disposed in the partition also suffer a similar pressure difference. Such a pressure difference deteriorates the sealing properties of the shaft-sealing parts (including seals) to a considerable extent, shortening the life of the seals. As one of the measures to cope with this problem, it has been proposed to use seals of particular construction having a sufficient pressure resistance. However, such seals are extremely expensive and render the structure of the shaft-sealing part on the rotating shaft complicated and large-sized.

As another measure to cope with the above-mentioned problem, German Offenlegungsschrift No. 2827026 discloses a shaft sealing device which can establish a pressure substantially equal to an external pressure around an apparatus provided with such device in the sealing part. However, such sealing is conducted only at one place and the sealing is not sufficient.

Accordingly, it is an object of the present invention to provide a device which can eliminate the foregoing disadvantages, and thus can assure the sealing effect of shaft-sealing parts on a rotating shaft in any pressurized gas or atmosphere.

BRIEF EXPLANATION OF DRAWINGS

FIGS. 2 to 6 are views illustrative of typical pressure-control means used in the first embodiment of the present invention;

PREFERRED EMBODIMENTS OF THE PRESENT INVENTION

A preferred embodiment of the pressure-control device according to the present invention will now be explained.

First Embodiment

Figure 1:
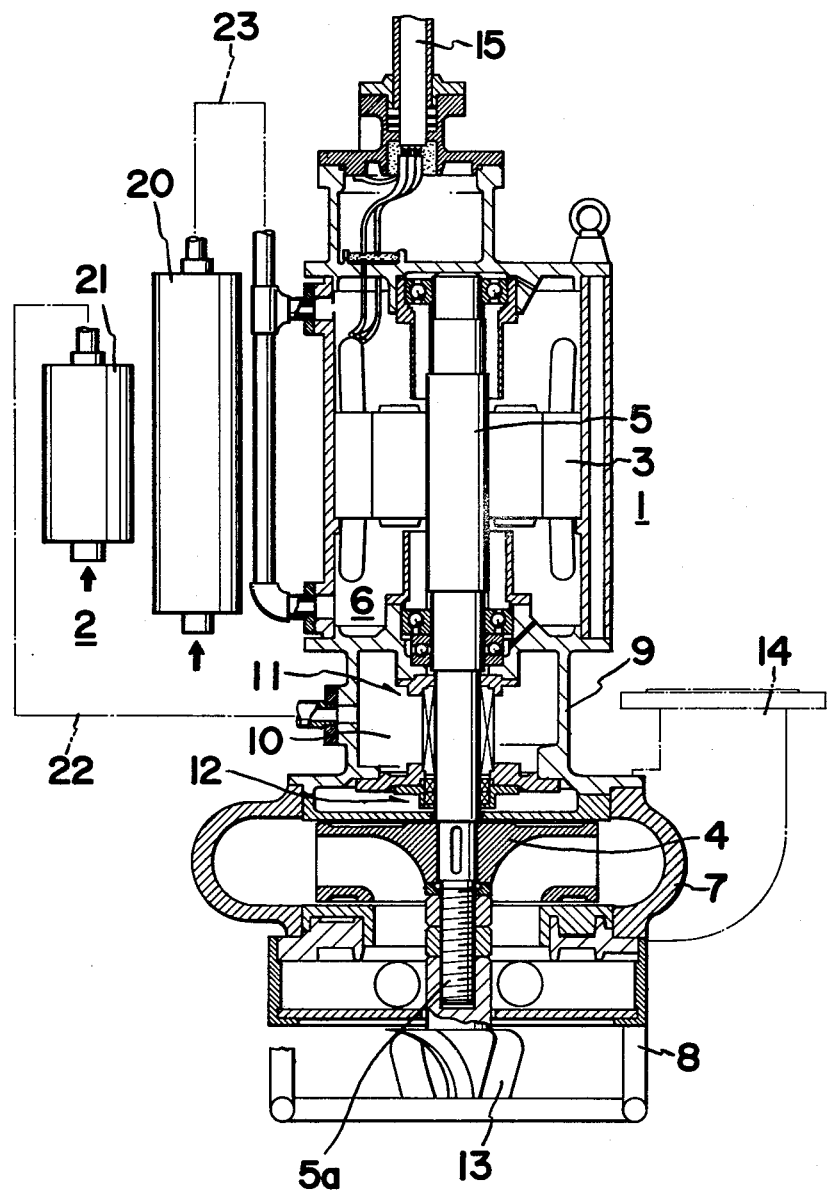
FIG. 1 is a front sectional view showing a first embodiment wherein the device of the present invention is applied to an underwater pump.

In FIG. 1, reference numeral 1 indicates an underwater pump and numeral 2 indicates a device of this invention which comprises a pair of pressure-control mechanisms.

Referring generally to the structure of the pump 1, a completely waterproof oil-immersed motor 3 includes an output shaft 5 which extends downwardly and has an impeller fixedly mounted thereon. The motor 3 also defines a motor chamber 6 therein. The impeller 4 is rotatably and concentrically encased in a stationary impeller casing 7, which is supported on a water bed by way of a supporting strut 8. An interconnecting casing 9 is provided to connect the oil motor 3 and be impeller casing 7, and such casing 9 defines an interconnect or oil chamber 10 therein. First and second shaft-sealing parts 11 and 12 are provided between the motor chamber 6 and the oil chamber 10, and between the oil chamber 10 and the impeller casing 7 respectively. An agitating blade 13 is secured to an extremity 5a of the output shaft 5 extending beyond the impeller 4. An elbow 14 has its one end connected to a sand discharge outlet of the impeller casing 7 and has another end connected to a suitable sand discharge line (not shown in the drawing) which transfers the sand, for example onto the ground. Reference numeral 15 designates a power cable.

In this embodiment, a pair of pressure-control mechanisms are constructed as as follows. Two pressure-control tanks 20 and 21 are substantially disposed in the vicinity of the underwater pump 2, and such tanks have their respective ends communicated with the motor chamber 6 and the oil chamber 10, respectively, by means of communicating pipes 22 and 23. Such pressure-control tanks 20, 21 transmit the surrounding water pressure to both motor chamber 6 and oil chamber 10 with the use of a pressurized medium contained therein. It should be noted that while the pressurized medium used in this embodiment is an oil, other liquid or gaseous fluids may optionally be used depending upon the conditions such as the purpose of the work, the equipment involved or the working area.

Figure 2:
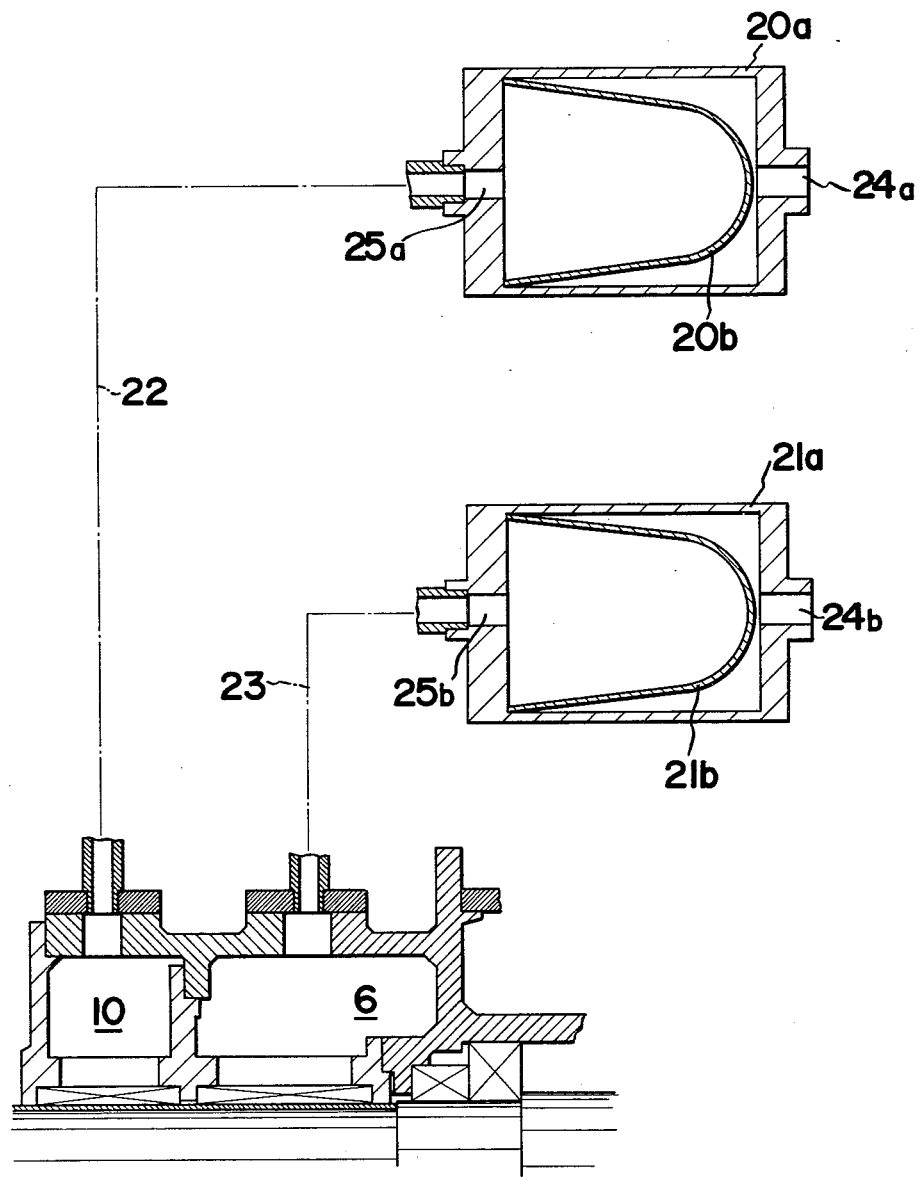
Figure 3:
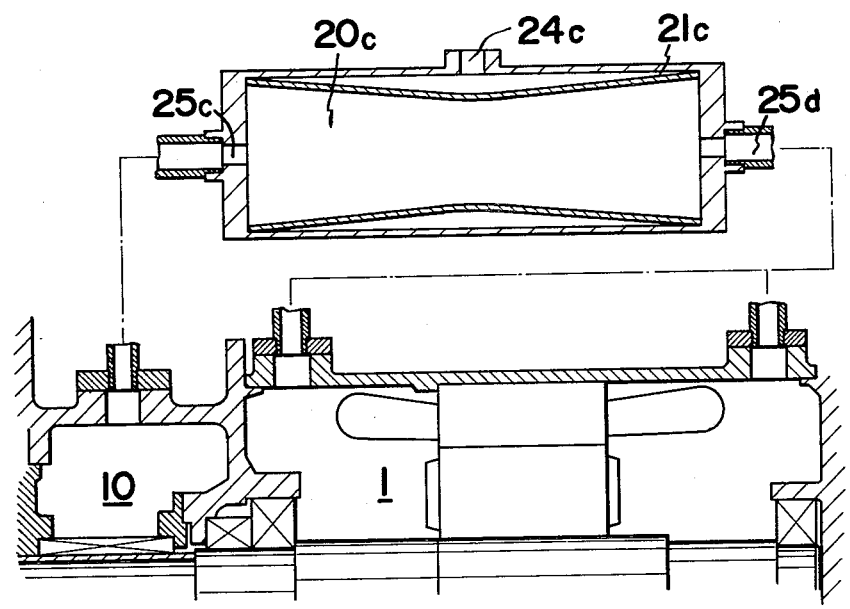
Figure 5:
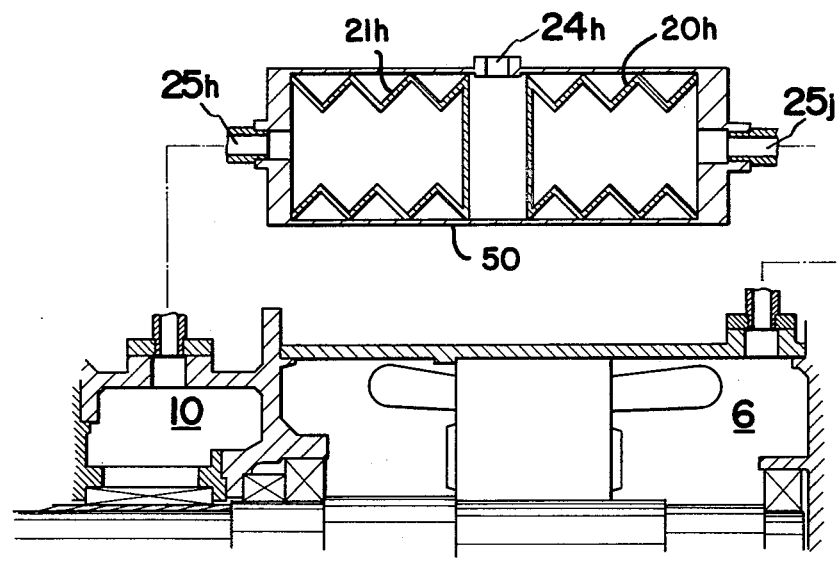

Tanks 20 and 21 utilized in this embodiment can take any form or construction. By way of example, typical pressure-control tanks are illustrated in FIGS. 2 to 7. In FIGS. 2 and 3, the pressure-control tanks 20 and 21 comprise protective sleeves 20a and 21a and expandable diaphragm bodies 20b and 21b having a variable volume, respectively. Each of the protective sleeves 20a and 21a is provided with a water inlet 24a, 24b at the respective distal end for introducing water therein. The sleeves 20a and 21a also have a water pressure transmission outlet 25a, 25b respectively at the proximal end thereof, wherein the outlet 25a communicates the chambers of the diaphragm bodies with the motor chamber 6 and the oil chamber 10. As illustrated in FIG. 3, the variable-volume bodies 20c and 21c may be formed as an integral piece. As shown in FIG. 4, the protective sleeves 20e and 21e may include bellows bodies 20g and 20f having a variable-volume in lieu of diaphragm bodies. As shown in FIG. 5, bellows bodies 20h, 21h are disposed in a single body 50. Alternatively, the volumes of the protective sleeves 20k and 21k may be varied by providing reciprocable pistons 51, 52 respectively therein, as will be understood from FIG. 6.

The manner in which the device of this invention is operated is described hereinafter. The underwater pump 1 is first immersed in the water, and placed on the bottom of the water or the floor. The underwater pump 1 then receives a uniform water pressure on the entire outer surface thereof. The shaft-sealing part 12 also receives a similar pressure on its outer side. According to the present embodiment, however, the pressure-control mechanism 2 is also subjected to the water pressure surrounding the pump 1 and therefore such water pressure is transmitted to the motor chamber 6 and the oil chamber 10 through the pressurized medium within the pipes 22 and 23. This ensures that a pressure equilibrium is established at the shaft-sealing part 11 disposed between the motor chamber 6 and the oil chamber 10 as well as at the shaft-sealing part 12 disposed between the oil chamber 10 and the impeller casing 7.

When the underwater apparatus is used at a deep place, it may be required that a variable-volume body having a greater volume under atmospheric pressure be used, and that a predetermined pressure of higher than 1 atm, for example, 2 to 3 kg/cm$^2$ is applied in advance to the interior of the apparatus.

The device according to the above embodiment has the following advantages over the prior art.

(1) Due to the establishment of the pressure-equilibrium at a plurality of shaft-sealing parts, a firm sealing effect is obtained in any pressurized atmosphere without any particular seal which inevitably leads to complication of the shaft-sealing parts.

(2) The occurrence of one-sided or eccentric thrust or force on the shaft-sealing parts can be avoided due to the pressure-equilibrium. Therefore, the shaft-sealing parts can withstand a long period of use, thus eliminating the frequent replacement thereof.

Second Embodiment

In the foregoing embodiment, however, it has sometimes been observed that a slight amount of the pressurized medium (liquid or gas) charged in the internal chamber or oil motor chamber of the equipment such as pump leaks out with the lapse of time. Such a leakage has to be made up. It has also been observed that an amount of water infiltrates incidentally into the oil chambers.

This embodiment discloses an underwater pump provided with indicator means which can readily locate such a leakage, thus enabling the pressure-control mechanism to be constantly operated in a normal condition.

For the purpose of simplicity, no detailed explanation is here given to the construction and the manner of operation of the pump and pressure-control mechanism, since they are substantially the same as those described in the first embodiment.

Figure 6:
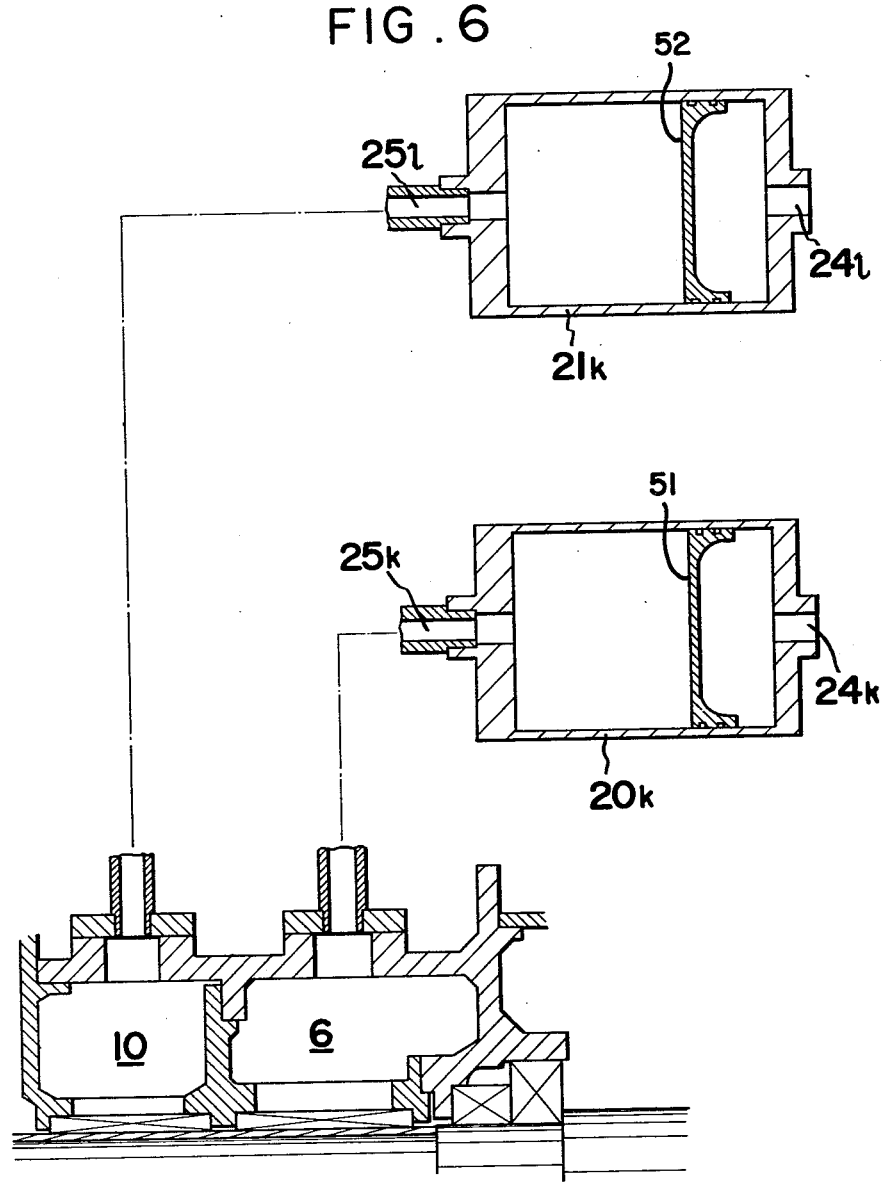
Figure 7:
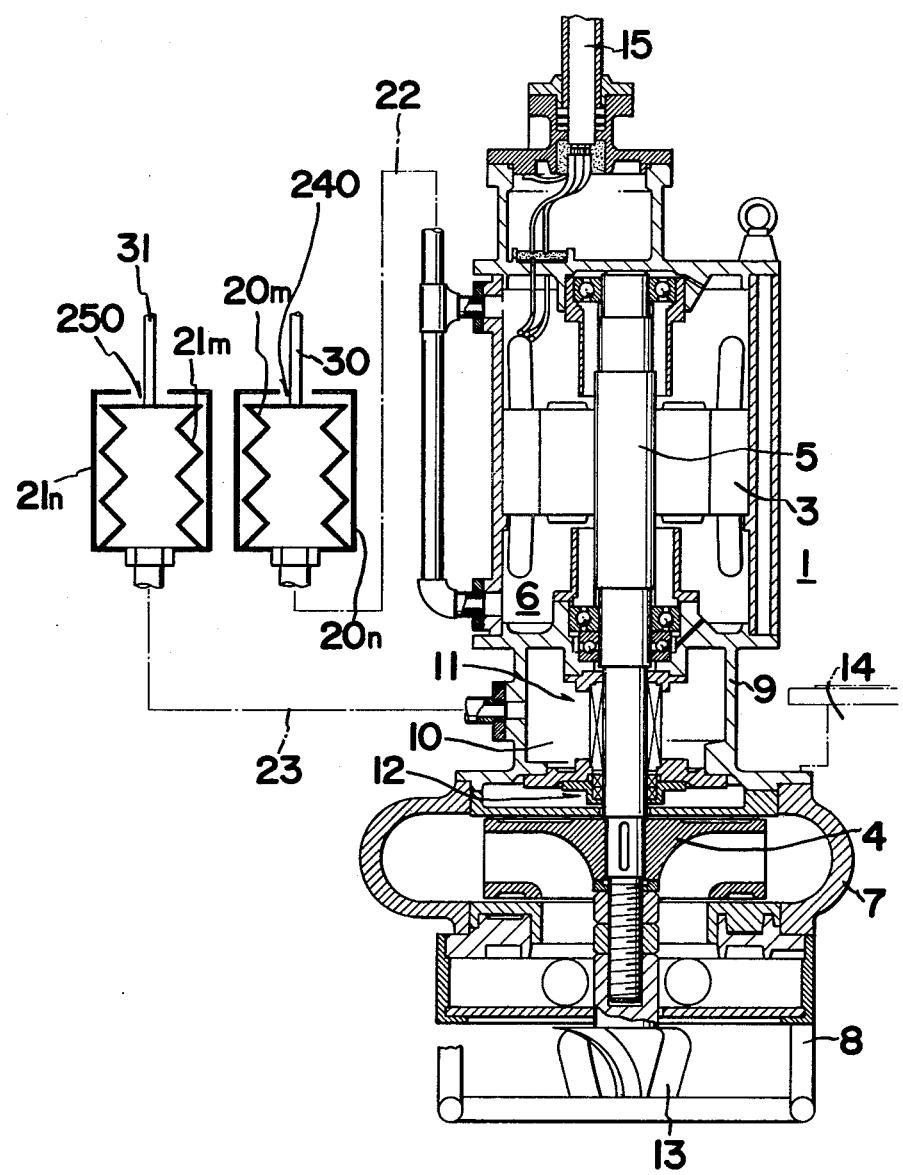
FIG. 7 is a front sectional view showing a second embodiment of the present invention, wherein the underwater pump is provided with indicator means.

As best shown in FIG. 7, the indicator means according to this embodiment comprises indicator rods 30 and 31 having proximal ends fixed on the upper portions of the variable-volume diaphragm bodies 20m and 21m and distal ends extending through water inlets 240 and 250. It will be understood that the indicator means may be mounted on the bellows and piston type variable-volume bodies as shown in FIG. 4 to FIG. 6. Along with the indicator rods 30 and 31, the indicator means further includes transparent calibrated windows mounted on the peripheries of the protective sleeves 20n and 21n in the longitudinal direction, through which variation of volume of the variable-volume body 20m or 21m are readily detected.

The pressure-control method carried out using the pressure-control mechanism equipped with the above-mentioned indicator means will now be explained. The underwater pump 1 is first immersed in the water, and is placed on the bottom of the water or the floor. The underwater pump 1 then receives a constant water pressure on the entire surface thereof. The shaft-sealing part 12 is also exposed to the water pressure on its outer side. According to the present invention, however, the pressure-control mechanism is also subjected to the water pressure through the water inlets 240, 250, and such water pressure is transmitted to the oil chambers 6 and 10 through the pressurized medium within the pipes 22 and 23. This ensures that the pressures applied on inner and outer sides of the shaft-sealing parts 11 and 12 are well-balanced.

Figure 9:
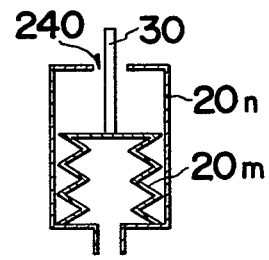
FIGS. 8 to 11 are views illustrative of the operation of the above indicator means.
Figure 8:
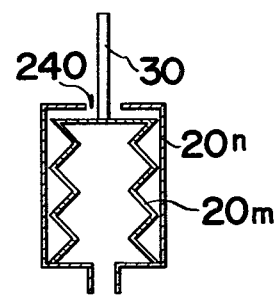
Figure 10:
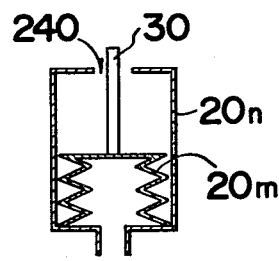
Figure 11:
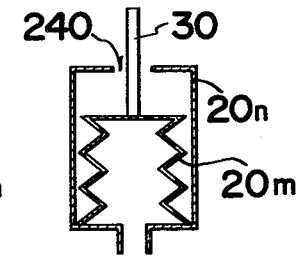

When the underwater pump 1 is not operated or is operated in a normal condition, the indicator rods 30 and 31 of the indicator means are located at a normal position as shown in FIG. 8 or 9 respectively. However, when there is a decrease in the amount of the sealing oil contained in the oil chamber 6 (abnormal condition), these indicator rods 30 and 31 take a withdrawn position as shown in FIG. 10. On the other hand, infiltration of water into the internal chamber (oil chamber) of the pump causes the indicator rods to take an extended position as shown in FIG. 10. In this manner, the leakage of sealing oil or the infiltration of water to the motor chamber and/or the oil chamber is readily detected by making a comparison between the amounts of movement of the indicator rods taking place in the abnormal and normal conditions, rendering it easy to take a required measure to meet the situation.

What is claimed is:

1. An underwater pump operable while immersed in a body of water comprising motor means driving an output shaft, said motor means being a water proof fluid-immersed motor having a motor fluid chamber, an impeller mounted on said output shaft, an impeller casing in which said impeller operates, an interconnecting casing disposed about said output shaft and located between said motor fluid chamber and said impeller casing, said interconnecting casing defining an interconnect fluid chamber, first shaft sealing means disposed about said output shaft between said motor fluid chamber and said interconnect fluid chamber, second shaft sealing means disposed about said output shaft between said interconnect fluid chamber and said impeller casing, and a pressure control mechanism mounted on the underwater pump and adapted to be immersed in said body of water with the underwater pump, said pressure control mechanism comprising pressure-sensitive means operable to sense the pressure of the body of water about said underwater pump and transmit said pressure to said motor fluid chamber and to said interconnect fluid chamber such that both said motor fluid chamber and said interconnect fluid chamber are at the same pressure corresponding to the pressure of the water about the outside of the underwater pump, whereby equalized pressure is provided on opposite sides of said first shaft sealing means for various operating depths of the underwater pump.

2. An underwater pump according to claim 1, wherein said pressure control mechanism comprises a bellows.

3. An underwater pump according to claim 1, wherein said pressure control mechanism comprises a hollow member made of rubber.

4. An underwater pump according to claim 1, wherein said pressure control mechanism comprises a diaphragm.

5. An underwater pump according to claim 1, wherein said pressure control mechanism comprises a cylinder and piston.

6. An underwater pump according to claim 1, wherein said pressure control mechanism comprises means defining a variable volume chamber, conduit means between said variable volume chamber and said interconnect chamber, whereby said variable volume chamber, said conduit means and said interconnect chamber define a closed circuit for fluid, and indicator means operable by said variable volume chamber to indicate changes in volume of said variable volume chamber, whereby said indicator means is operable to indicate outflow of fluid out of said closed circuit and inflow of fluid into said closed circuit.

7. An underwater pump according to claim 6, wherein said variable volume chamber is formed by a flexible enclosure means which is expandable and contractable in a longitudinal direction, said flexible enclosure means being disposed within a longitudinally extending housing, said housing having a first opening permitting the surrounding water to pass into said housing externally of said flexible enclosure means, said housing having a second opening communicating with said interconnect chamber via said conduit means, said second opening communicating with the interior of said flexible enclosure means, said indicator means comprising an indicator element mounted on said flexible enclosure means and movable longitudinally relative to said housing as said flexible enclosure means expands and contracts, whereby the longitudinal position of said indicator element relative to said housing provides an indication of outflow of fluid out of said closed circuit and inflow of fluid into said closed circuit.

8. An underwater pump according to claim 1, wherein said pressure control mechanism comprises means defining a variable volume chamber, conduit means between said variable volume chamber and said motor fluid chamber, whereby said variable volume chamber, said conduit means and said motor fluid chamber define a closed circuit for fluid, and indicator means operable by said variable volume chamber to indicate changes in volume of said variable volume chamber, whereby said indicator means is operable to indicate outflow of fluid out of said closed circuit and inflow of fluid into said closed circuit.

9. An underwater pump according to claim 8, wherein said variable volume chamber is formed by a flexible enclosure means which is expandable and contractable in a longitudinal direction, said flexible enclosure means being disposed within a longitudinally extending housing, said housing having a first opening permitting the surrounding water to pass into said housing externally of said flexible enclosure means, said housing having a second opening communicating with said motor fluid chamber via said conduit means, said second opening communicating with the interior of said flexible enclosure means, said indicator means comprising an indicator element mounted on said flexible enclosure means and movable longitudinally relative to said housing as said flexible enclosure means expands and contracts, whereby the longitudinal position of said indicator element relative to said housing provides an indication of outflow of fluid out of said closed circuit and inflow of fluid into said closed circuit.

10. An underwater pump operable while immersed in a body of water comprising motor means driving an output shaft, said motor means being a water proof fluid-immersed motor having a motor fluid chamber, an impeller mounted on said output shaft, an impeller casing in which said impeller operates, an interconnecting casing disposed about said output shaft and located between said motor fluid chamber and said impeller casing, said interconnecting casing defining an interconnect fluid chamber, first shaft sealing means disposed about said output shaft between said motor fluid chamber and said interconnect fluid chamber, second shaft sealing means disposed about said output shaft between said interconnect fluid chamber and said impeller casing, and a pressure control mechanism mounted on the underwater pump and adapted to be immersed in said body of water with the underwater pump, said pressure conrol mechanism comprising pressure-sensitive means operable to sense the pressure of the body of water about said underwater pump and transmit said pressure to said motor fluid chamber and to said interconnect fluid chamber such that both said motor fluid chamber and said interconnect fluid chamber are at the same pressure corresponding to the pressure of the water about the outside of the underwater pump, whereby equalized pressure is provided on opposite sides of said first shaft sealing means for various operating depths of the underwater pump, said pressure control mechanism comprising means defining a first variable volume chamber, first conduit means between said first variable volume chamber and said interconnect chamber, whereby said first variable volume chamber, said first conduit means and said interconnect chamber define a first closed circuit for fluid, and first indicator means operable by said first variable volume chamber to indicate changes in volume of said first variable volume chamber, whereby said first indicator means is operable to indicate outflow of fluid out of said first closed circuit and inflow of fluid into said first closed circuit, said pressure control mechanism further comprising means defining a second variable volume chamber, second conduit means between said second variable volume chamber and said motor fluid chamber, whereby said second variable volume chamber, said second conduit means and said motor fluid chamber define a second closed circuit for fluid, and second indicator means operable by said second variable volume chamber to indicate changes in volume of said second variable volume chamber, whereby said second indicator means is operable to indicate outflow of fluid out of said second closed circuit and inflow of fluid into said second closed circuit.

11. An underwater pump according to claim 10 further comprising a support structure extending from said impeller casing for supporting the underwater pump on the bottom of a body of water with the output shaft generally vertically disposed.

* * * * *